(12) United States Patent
Hoshino et al.

(10) Patent No.: US 7,452,485 B2
(45) Date of Patent: Nov. 18, 2008

(54) PHOSPHOR AND PLASMA DISPLAY PANEL

(75) Inventors: Hideki Hoshino, Hino (JP); Kazuyoshi Goan, Hino (JP); Kazuya Tsukada, Hino (JP); Naoko Furusawa, Hino (JP); Hisatake Okada, Hino (JP)

(73) Assignee: Konica Minolta Medical & Graphic, Inc, Tokyo (JP)

( * ) Notice: Subject to any disclaimer, the term of this patent is extended or adjusted under 35 U.S.C. 154(b) by 543 days.

(21) Appl. No.: 11/212,263

(22) Filed: Aug. 26, 2005

(65) Prior Publication Data

US 2006/0049740 A1 Mar. 9, 2006

(30) Foreign Application Priority Data

Sep. 3, 2004 (JP) ............................. 2004-257110

(51) Int. Cl.
*H01J 11/02* (2006.01)
*C09K 11/59* (2006.01)
*C09K 11/54* (2006.01)
*C09K 11/02* (2006.01)

(52) U.S. Cl. ............................. 252/301.6 F; 313/582; 313/584; 313/486

(58) Field of Classification Search ........... 252/301.6 F; 313/582, 584, 486
See application file for complete search history.

(56) References Cited

U.S. PATENT DOCUMENTS

| 4,925,703 A | * | 5/1990 | Kasenga et al. | ............. | 427/215 |
| 2006/0043339 A1 | * | 3/2006 | Tsukada | ............... | 252/301.4 R |

FOREIGN PATENT DOCUMENTS

JP 2004-091622 * 3/2004

* cited by examiner

*Primary Examiner*—C. Melissa Koslow
(74) *Attorney, Agent, or Firm*—Lucas & Mercanti, LLP (57) ABSTRACT

Disclosed are a phosphor in which prevention of aging deterioration of luminance and prevention of deterioration of discharging characteristics are compatible, a method of manufacturing the phosphor, and a plasma display panel manufactured by using the phosphor. A phosphor of the invention containing Mn as an activator is one with Mn serving as a major emission, wherein a ratio of an activator concentration in a superficial portion of a phosphor particle to an activator concentration inside the phosphor particle is 0.3-0.7.

7 Claims, 2 Drawing Sheets

PHOSPHOR AND PLASMA DISPLAY PANEL

This application claims priority from Japanese Patent Application No. Jp2004-257110 filed on Sep. 3, 2004, which is incorporated hereinto by reference.

TECHNICAL FIELD

The present invention relates to a phosphor and a plasma display manufactured by the use of the phosphor, and in particular, to a phosphor employing an activator and a co-activator to a plasma display manufactured by the use of the phosphor.

BACKGROUND

A display apparatus using a plasma display panel has been watched with keen interest in recent years, as a color display device capable of realizing a large size, a thin type and light weight, in a field of a color display device used for image display of a computer or a television set.

In a plasma display panel, a large number of discharge cells each being filled with discharge gas are provided between two glass base boards each being equipped with electrodes. The discharge cell is provided with a phosphor layer, and is arranged to generate vacuum ultraviolet rays when voltage is impressed between the electrodes for selective discharge, whereby the phosphor is excited to emit visible light.

As a phosphor instituting a phosphor layer, in this case, there is generally used a material wherein activators are dispersed in a base material shown below (Non-patent Document 1).

"Blue light emitting phosphor": $BaMgAl_{10}O_7$ "Green light emitting phosphor": $Zn_2SiO_4$:Mn "Red light emitting phosphor": $(Y_x, Gd_{1-x})BO_3$:Eu Incidentally, a color display device such as a plasma display panel has a problem that aging luminance deterioration is remarkable, namely, a problem that a life is short.

As a cause for the aging luminance deterioration, there are given vacuum ultraviolet rays which are generated by discharge in the plasma display panel in the case of driving it, or an ion impact, which damages a phosphor and causes its luminance deterioration. In the case of a green light emitting phosphor, in particular, its luminosity factor is higher than those of other colors, and therefore, drastic deterioration of white luminance and changes in chromaticity are undesirably caused on a plasma display panel, even when the phosphor is deteriorated slightly.

For preventing aging luminance deterioration, therefore, Patent Document 1 discloses a trial wherein a base material of a phosphor and an activator material are baked, then, base materials of phosphors are further mixed therewith to be baked, in which a period of time and temperature of the baking are controlled to regulate activator concentration (% by weight) so that the activator concentration (% by weight) inside a phosphor particle may be lower than that in a superficial portion of the particle, to prevent crystal deformation of the phosphor particle caused by an Mn dope representing an activator.

Further, in addition to the problems stated above, there has been a problem that electric charge characteristics are deteriorated in a color display device. A cause for the deterioration of the electric charge characteristics is low stability in the case of driving a plasma display panel for discharging. If stability in the course of discharging is low, there is caused a discharge failure such as discharge fluctuation or no occurrence of discharge, which remarkably deteriorates display quality.

For preventing the deterioration of the electric charge characteristics for the green light emitting phosphor containing Mn that serves as a major emission, therefore, Patent Document 2. discloses a trial wherein the deterioration of the electric charge characteristics is improved by enhancing stability in the course of discharging, by charging a phosphor from 0 to the positive electrode side, by the use of (1) a means to cover with oxides which positively charge a surface of a phosphor particle, for positive electrostatic charges, or (2) a means to smash a phosphor particle to make a fresh surface of the particle to be exposed, for positive electrostatic charges.

(Patent Document 1) TOKKAI No. 2004-91622
(Patent Document 2) TOKKAI No. 2003-18365
(Non-patent Document 1) "Electronics Jisso Gijutsu" p. 23-p. 26, 1977, Vol. 13, No. 7

SUMMARY

However, if activator concentration in the superficial portion of the phosphor particle is made lower as in Patent Document 1, deterioration of the electric charge, characteristics was observed because an amount of electrostatic charges of the phosphor exhibited negative polarity, although deterioration of a life was improved.

On the other hand, if a phosphor is coated with oxides which have been charged positively as in Patent Document 2, there are easily caused troubles resulting from isolation of the oxides, with the lapse of time, which results in a fear that discharge characteristics are worsened. Further, if the phosphor is smashed, a crystal itself is damaged, even if the phosphor is smashed in a way not to damage a crystal surface, thus, a life of the phosphor tends to be shortened.

As stated above, technologies mentioned above have been insufficient as an improving means that includes Patent Document 1 and Patent Document 2, prevents deterioration of discharging characteristics and prevents aging luminance deterioration.

The invention has been achieved in view of the problems stated above, and its object is to provide a phosphor wherein discharging characteristics are stabilized and aging luminance deterioration can be prevented, a manufacturing method of the phosphor and a plasma display panel manufactured by using the aforesaid phosphor.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

BRIEF DESCRIPTION OF THE PREFERRED EMBODIMENTS

The above object of the present invention is accomplished by the following structures.

(Structure 1) A phosphor possessing $Zn_2SiO_4$:Mn particles, wherein Mn is an activator, and a ratio of the activator concentration in a superficial portion of a phosphor particle to the activator concentration inside the phosphor particle is 0.3-0.7.

The invention described in Structure 1 is of a phosphor possessing $Zn_2SiO_4$:Mn particles, wherein Mn is an activator, and a ratio of the activator concentration in a superficial portion of a phosphor particle to the activator concentration inside the phosphor particle is 0.3-0.7, thus, by prescribing the activator concentration in a superficial portion of a phosphor particle, it is possible to minimize a deformation of crystal structure of the base material on the circumference of an activator caused by an activator dope, and thereby, to enhance crystallinity, in the superficial portion of the phosphor, without prescribing the activator concentration both in the superficial portion and inside the phosphor, compared with an occasion where the activator concentration in the superficial portion of the phosphor is the same as that in the inside of the phosphor.

In particular, when an amount of electrostatic charges of the phosphor is on the positive polarity side in this case, when constituting a plasma display panel, it is possible to make it to be a phosphor showing the same polarity as that of the phosphor whose amount of electrostatic charges shows a positive polarity, thereby, stability in discharging can be enhanced by reducing discharge fluctuations and discharge failures.

(Structure 2) The phosphor of Structure 1, wherein a ratio of the activator concentration in a superficial portion of a phosphor particle to the activator concentration inside the phosphor particle is 0.5-0.7.

In the invention described in Structure 2, a ratio of the activator concentration in a superficial portion of a phosphor particle to the activator concentration inside the phosphor particle is 0.5-0.7, and the lower limit of the activator concentration in the superficial portion of the phosphor particle is set to be high. Therefore, compared with the invention described in Structure 1, it is possible to make a charging amount of the phosphor to be on the positive polarity side while maintaining some crystallinity by controlling a distortion of a crystal structure of a base material in the superficial portion of the phosphor to a certain extent, whereby, an improvement of crystallinity can be made compatible with that of stability in the case of discharging.

(Structure 3) The phosphor of Structure 1 or 2, wherein an amount of electrostatic charges is in a range of 0-+30 μC/g.

The invention described in Structure 3 is the phosphor according to Structure 1 or 2, and a charging amount is within a range of 0-+30 μC/g, whereby, a distortion of a crystal structure of a base material caused by an activator dope on the circumference of the activator in the superficial portion of the phosphor can be made small, and the charging amount prescribed as stated above can be maintained while enhancing crystallinity. Therefore, when a plasma display panel is constituted, it is possible to show the same polarity as that of a phosphor wherein a charging amount shows positive polarity, and to enhance stability in the course of discharging, by reducing fluctuations in electric discharge and discharge failures.

(Structure 4) A plasma display panel possessing a discharge cell containing the phosphor of any one of Structures 1-3.

Since the invention described in Structure 4 is a plasma display panel wherein a discharge cell is provided with the phosphor described in any one of Structures 1-3, the plasma display panel may have the same effect as that obtained in each of Structures 1-3.

While the preferred embodiments of the present invention have been described using specific terms, such description is for illustrative purposes only, and it is to be understood that changes and variations may be made without departing from the spirit or scope of the appended claims.

DETAILED DESCRIPTION OF THE INVENTION

An embodiment of the invention will be explained as follows.

First, a phosphor relating to the invention will be explained. A phosphor of the invention is one containing an activator wherein manganese serves as a major emission, and a $Zn_2SiO_4$ phosphor is a base material.

In the invention, though an activator mainly shows manganese, it is also possible to make an activator composed of manganese to contain an activator composed of those other than manganese, namely, to contain a co-activator. In this case, the co-activator is not limited in particular, and an alkaline-earth metal and a rare earth metal can be contained properly. As a co-activator which is especially preferable, there are given magnesium, calcium and barium.

In the phosphor of the invention, a ratio of an activator concentration in a superficial portion of a phosphor particle to an activator concentration inside the phosphor particle is 0.3-0.7, preferably 0.5-0.7.

In this case, the activator concentration in the invention means an average concentration of activator, and the superficial portion of the phosphor in the invention means a portion where a depth is 2-5 nm from an uppermost surface of the phosphor particle. Incidentally, the phosphor particle size in the present invention is 0.1-10 μm, and preferably 0.5-5 μm. In general, Mn concentration, based on the phosphor particle, is 1-10% by weight, and preferably 4-8% by weight.

When a ratio of the activator concentration in a superficial portion of a phosphor particle to the activator concentration inside the phosphor particle is less than 0.3, in this case, a charging amount of the phosphor is on the negative polarity side and discharging characteristics are deteriorated remarkably, although an effect of improvement of a phosphor life is observed. On the other hand, it was clarified that, when a ratio of the activator concentration in a superficial portion of a phosphor particle to the activator concentration inside the phosphor particle exceeds 0.7, the phosphor life is seriously deteriorated, although a charging amount of the phosphor is on the positive polarity side and an improvement in deterioration of discharging characteristics is observed.

As stated above, it is estimated that the charging amount of the phosphor shows positive polarity as the activator concentration in a superficial portion of a phosphor particle approaches the activator concentration inside the phosphor, there is some correlation between the ratio of activator concentration in a superficial portion of the phosphor to activator concentration inside the phosphor and the charging amount of the phosphor, and that there are a ratio of activator concentration in a superficial portion of the phosphor to activator concentration inside the phosphor, and a charging amount of the phosphor, both make an improvement of a life to be compatible with stability in the course of discharging.

As a result, activator concentration in a superficial portion of the phosphor and activator concentration inside the phosphor are prescribed as stated above, which makes a charging amount of the phosphor of the invention to be in a range from 0 to +30 μC/g.

Incidentally, nothing has been clarified for the reason of existence of the ratio of activator concentration in a superficial portion of the phosphor to activator concentration inside the phosphor and the charging amount of the phosphor which make an improvement of a life to be compatible with stability in the course of discharging. However, the inventors of the present invention conjecture that the reason mentioned above is related to defects inside the phosphor and a distortion of a crystal structure, both are given as causes for deterioration of the phosphor, and to an amount of $SiO_2$ exposed in a superficial portion of a phosphor particle that is given as a cause for the phosphor to be charged on the positive polarity side that brings about deterioration of the phosphor, supposing a hypothesis described below.

If an amount of activators such as manganese in a superficial portion of the phosphor particle is small, a distortion of a crystal structure of a base material caused by an activator dope on the circumference of the activator is made small, whereby, crystallinity is enhanced, and aging deterioration of luminance, namely, a life is improved. However, under this condition, the outermost surface of the phosphor particle is covered by $SiO_2$, which suggests that a charging amount is on the negative polarity side.

On the other hand, if an amount of activators in a superficial portion of the phosphor particle is increased, a distortion of a crystal structure of a base material on the circumference of the activator grows greater, resulting in a tendency to deteriorates a life. However, that tendency is faint. It is known that there is a tendency of localization in a crystal when an amount of activators exceeds a certain level, and the condition of this kind is considered to cause rapid deterioration of luminance. Under this condition, a charging amount moves to be on the positive polarity side because an amount of $SiO_2$ on the outermost surface of the particle is reduced.

It is therefore possible to secure stability in the course of discharging while improving a life, by causing a ratio of an activator concentration in a superficial portion of a phosphor particle to an activator concentration inside the phosphor particle to be 0.3-0.7, preferably 0.5-0.7.

Next, a manufacturing method of a phosphor having the aforesaid characteristics will be explained as follows.

A phosphor containing manganese as an activator that serves as a major emission can be obtained through a manufacturing method having therein a precursor forming process wherein phosphor materials are mixed and a precursor is formed and a baking process wherein the precursor obtained in the precursor forming process is baked to obtain a phosphor. Incidentally, the precursor is an intermediate compound of a phosphor to be manufactured, and is a compound that is subjected to the process of baking to become a phosphor as stated earlier.

The precursor forming process will be explained first.

In the precursor forming process, it is preferable to form a precursor through a liquid phase method (which is also called "liquid phase synthesizing method").

The liquid phase method is a method to obtain a phosphor by preparing a phosphor precursor under existence of a liquid or in a liquid. In the liquid phase method, phosphor materials are subjected to a chemical reaction in the liquid phase, which causes the reaction to take place between ions of elements constituting the phosphor, thus, phosphors which are highly pure in theory of chemical formula weight are easily obtained. Further, compared with a solid phase method to manufacture phosphors by repeating reactions between solid phases and powdering processes, it is possible to obtain particles each having a microscopic size without conducting a powdering process, and to prevent lattice defects in a crystal caused by the stress applied in the course of powdering, and thereby to prevent a decline of light-emission efficiency.

In the invention, a coprecipitation method, a reaction crystallization method and a sol-gel method which have been known are preferably used as the liquid phase method. In particular, in the case of $Zn_2SiO_4$:Mn, it is preferable to form a precursor by the coprecipitation method with an Si compound such as Si or $SiO_X$ that serves as a host nucleus of a precursor.

The coprecipitation method is a method wherein solutions containing elements to become phosphor materials are mixed by using a coprecipitation phenomenon, and precipitating agents are further added, to synthesize a phosphor precursor, under the condition where metal elements to become activators are deposited around the host nucleus of the phosphor precursor.

The coprecipitation phenomenon is a phenomenon wherein, when a solution is subjected to precipitation, ions which cannot be precipitated because of the sufficient solubility under that condition are caused to follow precipitations. In manufacture of phosphors, the coprecipitation phenomenon means a phenomenon in which metal elements constituting activators are deposited around the host nucleus of the phosphor precursor.

For example, solution A containing an Si-based liquid composition in which materials (Si-based materials) composed of silicon-based compounds are dispersed in a liquid and containing precipitating agents and solution B containing Zn compounds and Mn compounds are mixed to prepare a precursor-dispersed solution. Under this condition, the solution A and solution C in which Zn compounds and Mn compounds are contained, and concentration of Mn compounds is lower than that in solution B are mixed to be added to the precursor-dispersed solution, which enables Mn concentration in a superficial portion of the precursor thus obtained to be lower than that in the inside of the precursor. Incidentally, it is more preferable that an alkaline-earth metal compound is contained in the solutions B and C. It is preferable that these are compounds of various types of metals such as chlorides and nitrates, and are those dissolved in the solvent in the state of a cation.

Figure 1:
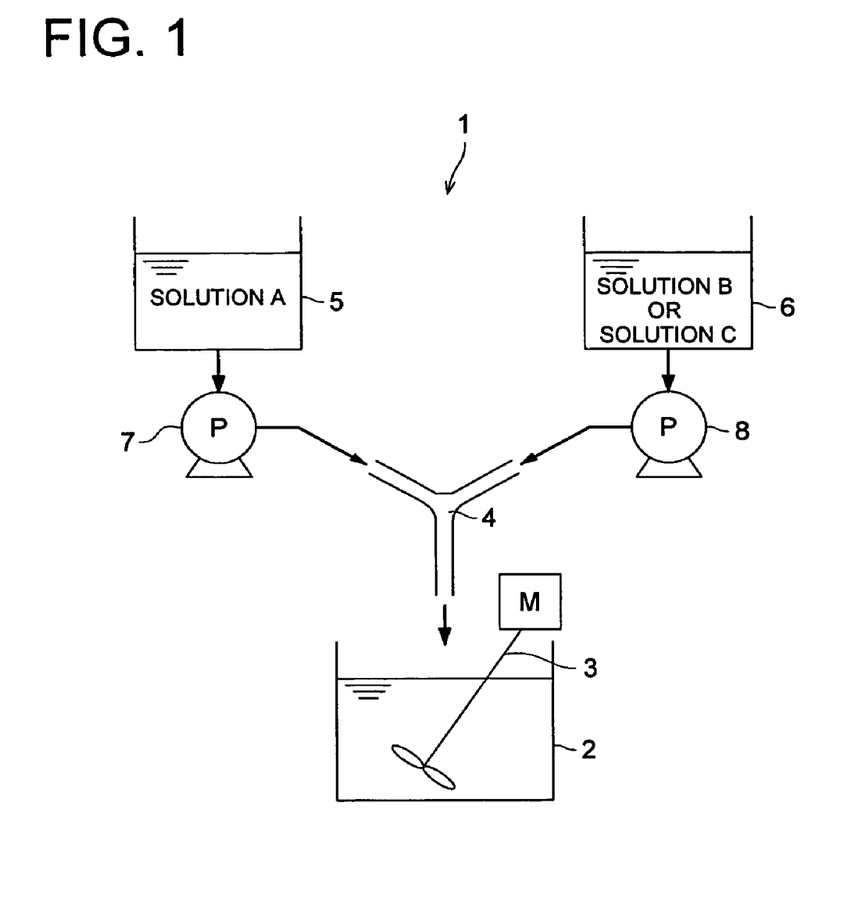
FIG. 1 is a schematic diagram of a Y-shaped reaction apparatus in the case of preparing a precursor of a phosphor.

When forming the precursor as stated above, Y-shaped reaction apparatus 1 shown in FIG. 1 is preferably used. Y-shaped reaction apparatus 1 is one that can add two or more types of liquids simultaneously at uniform velocity, to disperse them, and it is equipped with reaction vessel 2 for, mixing liquids and with stirring blade 3 that stirs the inside of reaction vessel 2, and it is one that enables liquids in tanks 5 and 6 to flow into reaction vessel 2 from tanks 5 and 6 connected respectively to the other ends of Y-shaped pipe 4 simultaneously and at uniform velocity, through Y-shaped pipe 4 provided above reaction vessel 2.

As a solvent, any types of solvents may be used provided that Si-based materials are not dissolved substantially in the solvent, water or alcohols or a mixture thereof are preferable. As alcohols, there are given methanol, ethanol, isopropanol, propanol and butanol. Among them, ethanol is especially preferable.

As precipitating agents, an organic acid or alkali hydroxide can be used preferably. The organic acid or alkali hydroxide reacts on metal element, and forms organic acid salt or a hydroxide as a sediment. In this case, it is preferable that sediments thereof are deposited around Si-based materials.

As an organic acid, those having a carboxylic acid group (—COOH) are preferable, and oxalic acid, formic acid, acetic acid and tartaric acid are given specifically. Further, those generating oxalic acid, formic acid, acetic acid or tartaric acid through hydrolysis may also be used.

As alkali hydroxide, any type of alkali may be used provided that the alkalis have a hydroxyl group (—OH), or they are those reacting on water to generate a hydroxyl group or those generating a hydroxyl group through hydrolysis, and examples of them include ammonia, sodium hydroxide, potassium hydroxide and urea. Among them, ammonia is used preferably, and especially preferable is ammonia containing no alkali metals.

The phosphor precursor thus obtained is an intermediate product of the phosphor of the invention, and it is preferable to obtain the phosphor by baking this phosphor precursor in accordance with prescribed temperature described later.

Next, a baking process will be explained.

In the baking process, a phosphor is formed by conducting baking process on the phosphor precursor obtained through the phosphor forming process.

Though the baking method is not restricted in particular, when baking the phosphor precursor, it is preferable to conduct baking in the oxidation atmosphere first, and then, to conduct baking in the inert atmosphere or the reduction atmosphere or in the atmosphere of both of them. In that case, the baking temperature and baking time may be adjusted for the highest efficiency, and as an embodiment for the preferable baking temperature, baking in the oxidation atmosphere is conducted in a range of 1000-1300° C., and baking in the inert atmosphere or the reduction atmosphere or in the atmosphere of both of them is conducted in a range of 300-1300° C. As an embodiment which is more preferable, the temperature in the oxidation atmosphere is higher than that in the inert atmosphere, or in the reduction atmosphere or in the atmosphere of both of them, for baking.

For example, in the oxidation atmosphere with nitrogen 79%-oxygen 21%, baking is conducted at about 1200° C. for 3 hours to oxidize the phosphor precursor, and then, baking is conducted for 4 hours at 600° C. in the reduction atmosphere with nitrogen 95%-hydrogen 5%, thus, a phosphor having a targeted composition can be obtained.

As a baking apparatus (baking vessel), all kinds of apparatuses which are presently known can be used. For example, a furnace of a box type, a crucible type furnace, a cylindrical tube type, a boat type and a rotary kiln are preferably used.

Sintering prevention agents may also be added in case of need in the course of baking. When adding sintering prevention agents, they can be added as slurry when forming a phosphor precursor. It is also possible to bake sintering prevention agents in a powder form after mixing them with dried precursors. Sintering prevention agents are not restricted in particular, and they can be selected properly depending on a type of the phosphor and on baking conditions.

After conducting a baking process, various processes such as cooling process and dispersing process may be conducted, and classification may also be carried out.

In the cooling process, phosphors obtained in the baking process are cooled. Though the cooling process is not restricted in particular, it can be selected properly from the known cooling methods, and for example, it is possible to cool the baked products while they are filled in the baking apparatus mentioned above. It is either possible to lower temperatures of the baked products by leaving them alone, or possible to lower temperatures forcibly by using a cooler while controlling temperatures.

In the dispersing process, there is conducted a process to prepare phosphor paste whose viscosity is properly adjusted by dispersing phosphors obtained through the step of baking process. Incidentally, adjustment of phosphor paste can be carried out by a method which has been known. In that case, it is preferable that the phosphor content in the phosphor paste is within a range from 30% by weight to 60% by weight.

As a binder that is suitable for dispersing phosphor particles excellently in the invention, there is given ethyl cellulose or polyethylene oxide (polymer of ethylene oxide), and in particular, ethyl cellulose having an average ethoxy group ($-OC_2H_5$) content ranging from 49% to 54% is preferably used. Further, as a binder, photosensitive resins can also be used. A preferable binder content is within a range of 0.15-10% by weight. Incidentally, for adjusting a shape of phosphor paste to be coated between partitions 30, the content of the binder is established to be somewhat higher within a range where paste viscosity does not grow too high, which is preferable.

As solvent, those in which organic solvents each having a hydroxyl group (OH group) are mixed are preferably used, and as specific examples of the organic solvent, there are given terpineol ($C_{10}H_{18}O$), butylcarbitol acetate, pentanediol (2,2,4-trimethylpentandiolemono isobutylate), dipentene (Dipentene, another name: Limonen) and butylcarbitol. The mixed solvent wherein the aforesaid organic solvents are mixed is excellent in solubility to dissolve the binder, that makes dispersibility of phosphor paste to be excellent, which is preferable.

It is preferable to add surfactant as dispersing agents, for improving dispersion stability of phosphor particles in the phosphor paste. As a content of surfactants in the phosphor paste, a range of 0.05-0.3% by weight is preferable from the viewpoint of obtaining effectively an effect of improving dispersion stability and an effect of neutralizing which will be described later.

As a specific example of the surfactant, (a) anionic surfactant, (b) cationic surfactant and (c) nonionic surfactant can be used, and those shown below may be given specifically. (a) As anionic surfactant, there are given fatty acid salts, alkylsulfuric acid, ester salts, alkylbenzenesulfonate, alkylsulfosuccinates and naphthalenesulfonic acid polycarboxylic acid copolymer. (b) As cationic surfactant, there are given alkylamine salts, quaternary ammonium salt, alkylbetaine and amine oxide. (c) As nonionic surfactant, there are given polyoxyethylene alkylether, polyoxyethylene derivative, sorbitan fatty acid ester, glycerin fatty acid ester and polyoxyethylene alkyl amine.

It is further preferable to add neutralizing substances to the phosphor paste. The surfactants stated above have generally neutralizing functions to prevent charging of the phosphor paste, and many of them come under the neutralizing substances. However, since neutralizing functions are different depending on types of phosphor, binder and solvent, various types of surfactants are tested, and those showing an excellent result are selected, which is preferable. As a neutralizing substance, fine particles composed of conductive materials are given, in addition to the surfactants. As conductive fine particles, there are given carbon fine particles including carbon black, fine particles of graphite, fine particles of metal such as Al, Fe, Mg, Si, Cu, Sn and Ag, and fine particles composed of oxides of the aforesaid metals. An added amount of these conductive fine particles is preferably within a range of 0.05-1.0% by weight for the phosphor paste. Owing to charging of the phosphor paste by adding neutralizing substances to the phosphor paste, it is possible to prevent failures of forming a phosphor layer including swelling of the phosphor layer on the gap of the address electrode on the panel center, some fluctuations in an amount of phosphor paste to be coated inside the cell and in the state of adhesion to the groove, for example, and to form a uniform phosphor layer for each cell.

Incidentally, when surfactants and carbon fine powder are used as neutralizing substances as stated above, the neutralizing substances do not remain in the phosphor layer after being baked, because the neutralizing substances are also evaporated or burnt down in the baking process of phosphors to remove solvents and binders contained in the phosphor paste. Therefore, there is no possibility that troubles in driving (light emission operation) of a plasma display panel are caused by neutralizing substances remaining in the phosphor layer.

When dispersing the phosphors of the invention in the aforesaid mixtures of various kinds, there may be used various items including one wherein a medium such as a high speed stirring homogenizer of an impeller type, a colloid mill, a roller mill, a ball mill, a vibration ball mill, an attritor mill, a planet ball mill or a sand mill, for example, is operated in the apparatus, and its collision (crush) and shearing force are used for pulverizing, or a dry type homogenizer such as a cutter mill, a hammer mill and a jet mill, a supersonic homogenizer, and a high pressure homogenizer.

After that, the phosphor paste adjusted in the aforementioned way is coated on or filled in discharge cell 31. Incidentally, when the phosphor paste is coated on or filled in discharge cell 31, various methods such as a screen printing method, a photoresist film method and an ink-jet printing method can be used. Especially in the ink-jet printing method, the phosphor paste can be coated or filled between partitions 30, easily, precisely and uniformly at low cost, even when a pitch of partitions 30 is narrow, and discharge cell 31 is formed to be small, which is preferable.

Next, an embodiment of a plasma display panel relating to the invention will be explained as follows, referring to FIG. 2. When the plasma display panel is classified roughly from the viewpoints of a structure of an electrode and of a mode of operations, there are two types including a DC type wherein DC voltage is impressed and an AC type wherein AC voltage is impressed. An example of a schematic structure of the plasma display panel of an AC type is shown in FIG. 2.

Figure 2:
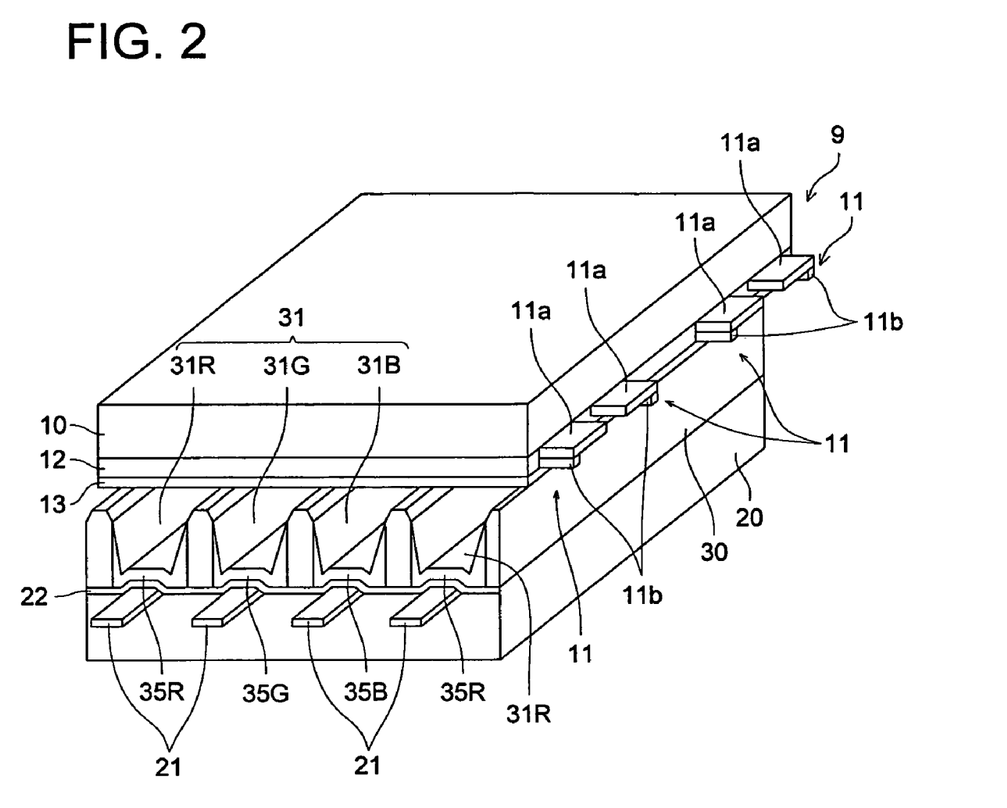
FIG. 2 is a perspective view showing an example of a plasma display panel relating to the invention.

Plasma display panel 9 shown in FIG. 2 is provided with front plate 10 representing a base plate to be arranged on the display side and with rear plate 20 that faces front plate 10.

First, front plate 10 will be explained. Front plate 10 is one to transmit visible light to display various pieces of information on the base plate, and to function as a display screen of plasma display panel 9, and display electrode 11, dielectric layer 12 and protective layer 13 are provided on front plate 10.

A material that transmits visible light such as soda-lime glass (blue sheet glass) can be used preferably as front plate 10. A thickness of front plate 10 ranging from 1 mm to 8 mm is preferable, and a thickness of 2 mm is more preferable.

A plurality of display electrodes 11 are provided on a surface of front plate 10, the surface facing rear plate 20, and they are arranged regularly. Display electrode 11 is provided with transparent electrode 11a and bus electrode 11b, and they are in the structure wherein bus electrode 11b formed to be in the shape of a belt is laminated on transparent electrode 11a formed to be in a broad belt. A width of bus electrode 11b is formed to be narrower than that of transparent electrode 11a. One set of display electrode 11 is composed of two display electrodes 11 which are arranged to face each other through a prescribed discharge gap.

As transparent electrode 11a, a transparent electrode such as a nesa film can be used, and its sheet resistance is preferably 100 Ω or less. AS a width of transparent electrode 11a, a range of 10-200 μm is preferable.

Bus electrode 11b which is provided by forming 3 layers of Cr/Cu/Cr via sputtering is one to lower the resistance. AS a width of bus electrode 11b, a range of 5-50 μm is preferable.

Dielectric layer 12 covers a total surface of front plate 10 where display electrodes 11 are arranged. Dielectric layer 12 can be formed with dielectric materials such as low-melting glass. AS a thickness of dielectric layer 12, a range of 20-30 μm is preferable. A surface of dielectric layer 12 is totally covered by protective layer 13. A film of MgO can be used for protective layer 13. AS a thickness of protective layer 13, a range of 0.5-50 μm is preferable.

Rear plate 20 will be explained next. On rear plate 20, there are provided address electrode 21, dielectric layer 22, partition 30, phosphor layers 35R, 35G and 35B.

Soda-lime glass can be used for rear plate 20 in the same way as in front plate 10. A thickness of rear plate 20 ranging from 1 mm to 8 mm is preferable, and a thickness of 2 mm is more preferable.

A plurality of address electrodes 21 are provided on a surface of rear plate 20, the surface facing front plate 10. Address electrode 21 is also formed to be in the shape of a belt, in the same way as in transparent electrode 11a and bus electrode 11b. A plurality of address electrodes 21 are provided at prescribed intervals so that they intersect display electrodes 11 at right angles when they are viewed on a plane.

A metal electrode such as Ag thick film electrode can be used for address electrode 21. AS a width of address electrode 21, a range of 100-200 μm is preferable.

Dielectric layer 22 covers a total surface of rear plate 20 where address electrodes 21 are arranged. Dielectric layer 22 can be formed with dielectric materials such as low-melting glass. AS a thickness of dielectric layer 22, a range of 20-30 μm is preferable.

On both sides of address electrodes 21 on dielectric layer 22, there are provided partitions 30 each being formed to be long, so that they may stand from rear plate 20 side to front plate 10 side, and partitions 30 intersect the display electrodes 11 when they are viewed in a plane. Partitions 30 form a plurality of microscopic discharge spaces (hereinafter referred to as discharge cells) 31 which are partitioned in a form of stripes between rear plate 20 and front plate 10, and discharge gas mainly containing rare gas is filled in each discharge cell 31.

Dielectric materials such as low-melting glass can be used for forming partition 30. A width of partition 30 ranging from 10 μm to 500 μm is preferable, and a width of about 100 μm is more preferable. A height (thickness) of partition 30 is usually in a range of 10-100 μm, and a height of about 50 μm is preferable.

On discharge cell 31, phosphor layers of any of 35R, 35G and 35B composed of the phosphor of the invention emitting light of any one of red (R), green (G) and blue (B) are arranged in a regular sequence. In one discharge cell 31, there are many intersecting points each representing a position where display electrode 11 intersects the address electrode 21, and one pixel is composed of three light-emission units for R, G and B each being continuous from side to side, with the aforesaid intersecting points each being a minimum light-emission unit. Though a thickness of each of phosphor layers 35R, 35G and 35B is not restricted, its range of 5-50 μm is preferable.

When forming phosphor layer 35G, the phosphors of the invention are dispersed in mixtures of binders, solvents and dispersing agents, then, the phosphor paste adjusted to appropriate viscosity is coated on or filled in discharge cell 31, to be dried or baked, thus, there is formed phosphor layer 35G having therein the phosphor of the invention adhering to the side of partition 30a and to bottom 30a.

When forming phosphor layer 35R and phosphor layer 35B, a phosphor of red color, a phosphor of blue color and phosphor paste are prepared through a conventional known method, and there are formed phosphor layer 35R and phosphor layer 35B having therein respectively the phosphor of red color and the phosphor of blue color each adhering to the side of partition 30a and to bottom 30a, in the same way as in the case of forming phosphor layer 35G.

By constituting the plasma display panel as stated above, when displaying, triggered discharge is conducted between address electrode 21 and either one of a set of display electrodes 11 and 11, to select a discharge cell that conducts displaying. After that, sustaining discharge is conducted between a set of display electrodes 11 and 11 in the selected discharge cell, whereby, ultraviolet radiation caused by discharge gas is generated to enable phosphor layers 35R, 35G and 35B to generate visible light.

From the foregoing, in the invention, when a ratio of the activator concentration in a superficial portion of a phosphor particle to the activator concentration inside the phosphor particle is prescribed to be 0.3-0.7, preferably to be 0.5-0.7, in a $Zn_2SiO_4$ phosphor containing Mn as an activator that serves as a major emission, a charging amount of the phosphor is prescribed to be within a range of 0-+30 μC/g, thus, it is possible to enhance stability in the course of discharge, while making a distortion of a crystal structure of a base material around an activator caused by the activator dope in the superficial portion of the phosphor to be small to enhance crystallinity.

AS a result, it is possible to prevent deterioration of discharge characteristics while improving aging luminance, and thereby to make improvement in aging luminance and prevention of deterioration of discharge characteristics to be compatible.

Therefore, in the plasma display panel employing the phosphor of the invention, aging deterioration of luminance is vastly reduced, and the life can be lengthened.

The characteristics of the phosphor of the invention stated above can be confirmed by the following method.

In the invention, the activator concentration in the superficial portion of the phosphor particle can be confirmed by an X-ray excited photoelectron spectroscopy.

The X-ray excited photoelectron spectroscopy is a method wherein a sample is irradiated with monochromatic X-rays, and kinetic energy of photoelectrons emitted from the surface is analyzed, and this method makes it possible to analyze an elemental composition existing in a depth of several tens Å on the surface of the sample qualitatively and quantitatively. Further, information about chemical conditions of each element can be obtained, because there appear the satellite that is assumed to be based on chemical shift by an influence of an adjoining element and on electric charge moving transition, and the core level fragmentation caused by multiplet bond.

The activator concentration inside the phosphor particle can be confirmed by an inductively coupled plasma emission spectroscopy.

The inductively coupled plasma emission spectroscopy is a method to introduce a sample in the high temperature of argon plasma, and thereby to measure specific light of each element generated, and it is possible to conduct highly sensitive qualitative and quantitative analyses, because the intensity of its light is proportional to an amount of an element in the sample. Since the plasma is at a high temperature, optimum measuring conditions for the most of elements are the same substantially, and multiple elements can be analyzed simultaneously and successively.

In the invention, a charging amount of phosphors can be confirmed by a blow-off method.

The blow-off method is a method wherein mixtures including carriers and phosphors are put in a metal vessel covered with a wire net (mesh) which partially has an opening provided with holes each having a diameter that can transmit only phosphors, then, gas such as dried air is blown to stir the phosphors and the carriers to blow only the phosphors away from the metal vessel. Owing to this, electric charges in the entire vessel which are in the quantity identical to that of the phosphors and have the polarity that is opposite to that of the phosphors can be detected, whereby, an amount of charges of the phosphors can be detected. Incidentally, in the present embodiment, a charging amount of the phosphors is detected as a charging amount for carriers (those in which ferrite ($Fe_2O_3$) or magnetite ($Fe_3O_4$) is coated with resins, or those in which a trace of metal is mixed, are preferably used).

EXAMPLE

There will be explained Example 1 of the invention, to which, however, the invention is not limited.

Example 1

In Example 1, phosphors (1-1)-(1-7) were prepared as green light emitting phosphor ($Zn_2SiO_4$:Mn), then, a plasma display panel was manufactured by using phosphor paste prepared from the phosphors thus obtained, and emission luminance of the plasma display panel was evaluated. Preparation of the phosphor used for the plasma display panel will be explained, first.

1. Preparation of Green Light Emitting Phosphor (1) Preparation of Phosphor (1-1)

Solution A was prepared by mixing colloidal silica (PL-3 produced by Fuso chemical Co., Ltd.) containing 45 g of silicon dioxide and 219 g of ammonia water (28%) in pure water and by adjusting an amount of the solution to 1500 cc. Concurrently with the foregoing, solution B was prepared by dissolving 424 g of zinc nitrate hexahydrate (purity 99.0% produced by Kanto chemical Co., Ltd.) and 21.5 g of manganese nitrate hexahydrate (purity 98.0% produced by Kanto chemical Co., Ltd.) in pure water and by adjusting an amount of the solution to 1500 cc. and solution C was prepared by dissolving 424 g of zinc nitrate hexahydrate (purity 99.0% produced by Kanto chemical Co., Ltd.) in pure water and by adjusting an amount of the solution to 1500 cc.

Solutions A and B were put respectively in tank 5 and tank 6 to be kept at 40° C., then, roller pumps 7 and 8 were respectively used to supply them to Y-shaped reaction apparatus 1 as shown in FIG. 1 at an adding speed of 1200 cc./min, whereby, a precursor-dispersed solution was obtained. Then, the precursor-dispersed solution was stirred in reaction vessel 2. Next, while maintaining this state, the solution A and solution C were put respectively in tank 5 and tank 6 to be kept at 40° C., then, roller pumps 7 and 8 were respectively used to supply them, at an adding speed of 1200 cc./min., to the reaction vessel 2 in which the precursor-dispersed solution is stored. After sediment obtained through reaction was diluted with pure water, it was subjected to pressure filtering and to liquid-solid separation. Thus, dried precursor was obtained by drying at 200° C. for 12 hours.

Next, the precursor thus obtained was baked at 1280° C. for 9 hours under the oxidation atmosphere (nitrogen 79%-oxygen 21%), and then, it was baked at 1100° C. for 6 hours under the inert atmosphere (nitrogen 100%), thus, phosphor 1-1 was obtained.

(2) Preparation of Phosphor (1-2)

Phosphor (1-2) was obtained in the same way as in the (1) phosphor (1-1), except that 5.4 g of manganese nitrate hexahydrate was added to solution C.

(3) Preparation of Phosphor (1-3)

Phosphor (1-3) was obtained in the same way as in the (1) phosphor (1-1), except that 7.1 g of manganese nitrate hexahydrate was added to solution C.

(4) Preparation of Phosphors (1-4)

Phosphor (1-4) was obtained in the same way as in the (1) phosphor (1-1), except that 10.1 g of manganese nitrate hexahydrate was added to solution C.

(5) Preparation of Phosphors (1-5)

Phosphor (1-5) was obtained in the same way as in the (1) phosphor (1-1), except that 11.6 g of manganese nitrate hexahydrate was added to solution C.

(6) Preparation of Phosphors (1-6)

Phosphor (1-6) was obtained in the same way as in the (1) phosphor (1-1), except that 14.2 g of manganese nitrate hexahydrate was added to solution C.

(7) Preparation of Phosphors (1-7)

Phosphor (1-7) was obtained in the same way as in the (1) phosphor (1-1), except that 15.7 g of manganese nitrate hexahydrate was added to solution C.

2. Preparation of Red Light Emitting Phosphor ((Y, Gd)BO$_3$: Eu)

A precursor of a red light emitting phosphor was formed by a reaction crystallization method under existence of protective colloid. First, solution D was prepared by dissolving gelatin (average molecular weight of about 15000) in 300 ml of pure water so that its concentration may be 5% by weight.

Further, 28.99 g of yttrium nitrate hexahydrate, 15.88 g of gadolinium nitrate and 2.60 g of europium nitrate hexahydrate were dissolved in pure water to be adjusted to 150 ml to prepare solution E. Further, 8.20 g of boric acid was dissolved in pure water to be adjusted to 150 ml to prepare solution F.

In the next place, solution D was put in a reaction vessel and it was stirred by a stirring blade while its temperature was kept at 60° C. Under that condition, solution E and solution F both kept at 60° C. likewise were added in the reaction vessel in which solution D is stored, at constant speed of 60 ml/min. After the addition of both solutions, ripening was conducted for 10 min., and a red light emitting phosphor was obtained. After that, the red light emitting phosphor was subjected to filtering and drying (at 105° C. for 16 hours), and it was further baked for 2 hours under oxidation conditions at 1200° C., to obtain the red light emitting phosphor.

3. Preparation of Blue Light Emitting Phosphor (BaMgAl$_{10}$O$_{17}$:Eu)

In the same way as in the method of preparing the red light emitting phosphor in the aforesaid Item 2, solution G was obtained by dissolving gelatin (average molecular weight of about 15000) in 300 ml of pure water so that its concentration may be 5% by weight. Further, 5.80 g of barium nitrate, 0.89 g of europium nitrate hexahydrate and 5.13 g of magnesium nitrate hexahydrate were dissolved in 295.22 ml of pure water to prepare solution H. Further, 85.03 g of aluminum nitrate nonahydrate was dissolved in 268.85 ml of pure water to prepare solution I.

A precursor of a blue light emitting phosphor was formed through a reaction crystallization method by using solutions G, H and I adjusted as stated above, in the same way as in the method shown in preparation of the red light emitting phosphor in the aforesaid Item 2, and it was baked to obtain the blue light emitting phosphor with an average particle size of 0.52 μm.

2. Preparation of Phosphor Paste

A green light emitting phosphor, a red light emitting phosphor and a blue light emitting phosphor composed of the phosphors (1-1)-(1-7) prepared as stated above were used to prepare a paste of the green light emitting phosphor, a paste of the red light emitting phosphor and a paste of the blue light emitting phosphor which are composed of phosphor paste (2-1)-(2-7). In the preparation, ethylcellulose, polyoxylene alkylether, and admixture (1:1) of terpineol and pentadiol are all mixed so that the concentration of solids in each phosphor may be 50% by weight.

3. Manufacturing of Plasma Display Panel

(1) Manufacturing of Plasma Display Panel (3-1)

A plasma display panel shown in FIG. 2 was manufactured as follows, by using phosphor paste (2-1), a paste of a red light emitting phosphor and a paste of a blue light emitting phosphor which were prepared as stated above.

First, a transparent electrode is arranged on a glass base plate representing front plate 10, as transparent electrode 11a. Next, bus electrode 11b is formed on the transparent electrode 11a as display electrode 11, by forming 3 layers of Cr/Cu/Cr via sputtering and photoetching. Then, low-melting glass is coated on the surface of glass base plate 10 so that display electrode 11 may be covered, to be baked at temperature of 500-600° C., whereby, dielectric layer 12 is formed. Further, MgO is deposited on dielectric layer 12 by an electron beam, and protective layer 13 is formed.

On the other hand, an Ag thick layer is printed on rear plate 20 to be baked, thus, address electrode 21 is formed. Then, partitions 30 are formed on both sides of address electrode 21 on rear plate 20. Partition 30 is formed by printing low-melting glass at an interval of 0.2 mm and by baking it. Further, phosphor paste 2-1, red light emitting phosphor paste and blue light emitting phosphor paste are coated on or filled in the base of discharge cell 31 (above address electrode 21) and side 30a which are divided by partition 30.

In this case, phosphor paste in a single color is used for one discharge cell 31. After that, the phosphor paste is dried and baked to remove organic components in the paste, and thereby to form phosphor layers 35R, 35G and 35B each having a different emission color, respectively on discharge cells 31R, 31G and 31B.

Then, front plate 10 on which electrodes 11 are arranged and rear plate 20 on which electrodes 21 are arranged are positioned so that their surfaces where electrodes are arranged may face each other, and circumferences of the front plate and the rear plate are sealed by sealing glass (not illustrated) in a way that both plates may face each other with a gap of about 1 mm between them. Then, gas in which xenon (Xe) that generates ultraviolet rays when discharging and neon (Ne) representing primary discharge gas are mixed is sealed hermetically in a space between base plates 10 and 20, to be aged later, whereby plasma display panel (3-1) was prepared.

(2) Manufacturing of Plasma Display Panel (3-2)

Plasma display panel (3-2) was manufactured in the same way as in the plasma display panel (3-1) in the Item (1), except that phosphor paste (2-2) adjusted in the foregoing manner was used in place of phosphor paste (2-1), in the aforesaid Item (1).

(3) Manufacturing of Plasma Display Panel (3-3)

Plasma display panel (3-3) was manufactured in the same way as in the plasma display panel (3-1) in the Item (1), except that phosphor paste (2-3) adjusted in the foregoing manner was used in place of phosphor paste (3-1), in the aforesaid Item (1).

(4) Manufacturing of Plasma Display Panel (3-4)

Plasma display panel (3-4) was manufactured in the same way as in the plasma display panel (3-1) in the Item (1), except that phosphor paste (2-4) adjusted in the foregoing manner was used in place of phosphor paste (2-1), in the aforesaid Item (1).

(5) Manufacturing of Plasma Display Panel (3-5)

Plasma display panel (3-5) was manufactured in the same way as in the plasma display panel (3-1) in the Item (1), except that phosphor paste (2-5) adjusted in the foregoing manner was used in place of phosphor paste (2-1), in the aforesaid Item (1).

(6) Manufacturing of Plasma Display Panel (3-6)

Plasma display panel (3-6) was manufactured in the same way as in the plasma display panel (3-1) in the Item (1), except that phosphor paste (2-6) adjusted in the foregoing manner was used in place of phosphor paste (2-1), in the aforesaid Item (1).

(7) Manufacturing of Plasma Display Panel (3-7)

Plasma display panel (3-7) was manufactured in the same way as in the plasma display panel (3-1) in the Item (1), except that phosphor paste (2-7) adjusted in the foregoing manner was used in place of phosphor paste (2-1), in the aforesaid Item (1).

4. Evaluation (1) Measurement of Activator Concentration Ratio

For the phosphors (1-1)-(1-7) prepared in the foregoing, the activator concentration inside the phosphor particle and the activator concentration in the superficial portion of the phosphor particle were measured, and a ratio of an activator concentration in a superficial portion of a phosphor particle to an activator concentration inside the phosphor particle was obtained, and results of them are shown in Table 1.

In that case, X-ray excited photoelectron spectroscopy apparatus ESCALab200R produced by VG Elemental. was used for measurement of manganese concentration in the superficial portion of the phosphor.

For measurement of Mn concentration inside the phosphor, inductively coupled plasma emission spectroscopy apparatus SPS5000 produced by Seiko Instrument Inc. or inductively coupled plasma mass analyzing apparatus QP-Q produced by VG Elemental was used, after dissolving phosphor surface in a range of 2-5 nm from the outermost surface of the phosphor by hydrofluoric acid. In that case, a reference concentration liquid was prepared by adding a standard stock solution produced by Kanto Chemical Co., Ltd. and nitric acid (produced by Kanto Chemical Co., Ltd. extra-high purity) separately, and quantitative determination was conducted in accordance with a calibration curve method.

(2) Measurement of Charging Amount

For the phosphors (1-1)-(1-7) prepared in the method stated above, charging amount of phosphors was measured, and results of them are shown in the following Table 1.

In that case, blow-off powder charging amount measuring instrument Model TB-200 produced by Toshiba Chemical Co., Ltd. was used for measurement of a charging amount of phosphors, and the charging amount of phosphors was expressed as an charging amount for the carriers.

First, those wherein phosphors and carriers are mixed so that a ratio of phosphors to carriers may be 1/19 are inputted in a measurement cell provided with a conductive mesh of 400 mesh through which only a phosphor particle can be transmitted. Next, compressed air that makes the inside of the measurement cell to be 0.5 Kgf/cm$^2$ is blown for 6 seconds, and phosphor particles only are separated and removed to the outside of the measurement cell. In this case, charges which are equivalent in terms of quantity to, but are different in terms of polarity from charges of the separated phosphor particles, are held in the carrier particles remaining in the measurement cell. It is therefore possible to obtain a charging amount of the phosphors by detecting the residual charging amount by an electrometer and by reading oppositely a polarity of the detected charging amount thus obtained. Incidentally, resin-coated ferrite carriers DFC-C having an average particle size of 60 μm (produced by Dowa Iron Powder Co., Ltd.) were used as carriers, and Table 1 below shows a charging amount per 1 g of each phosphor sample.

(3) Measurement of Luminance After Deterioration

Luminance after deterioration was measured as follows, for plasma display panels (3-1)-(3-7) manufactured by the method mentioned above.

First, an emission luminance (initial luminance) immediately after lighting of each plasma display panel was measured for plasma display panels (3-1)-(3-7), and a period of time for the plasma display panel (3-1) to keep displaying a green color until the emission luminance of the plasma display panel (3-1) resulted in 50% of the initial luminance was measured. Then, each of the plasma display panels (3-2)-(3-7) was lighted for a period of time that is the same as the time for which the plasma display panel (3-1) kept displaying a green color until its emission luminance resulted in 50% of the initial luminance, and emission luminance at an end of lighting (luminance after deterioration) was measured. The results of them are shown in the following Table 1. Luminances after deterioration shown in Table 1 are relative emission luminances for plasma display panels (3-2)-(3-7) for the luminance after deterioration of the plasma display panel (3-1) which is 100.

(4) Measurement of Stability for Discharge

In the course of the aforesaid Item (3), stability for discharge was measured by the use of the following expression (1) which is generally used for evaluations of stability for discharge.

$$Nt/No = \exp(-(t-tf)/ts) \qquad (1)$$

In the expression (1) above, Nt represents the number of times of discharge failures in a period of time t (the number of times of discharge errors), No represents the number of times of measurement for discharge delay time, tf represents a delay of forming and ts represents discharge fluctuations. In the present example, stability of discharge was evaluated by the number of times of discharge errors and by discharge fluctuations, which is shown in the following Table 1.

The number of times of discharge errors is the number of times of occasions in each of which no discharge takes place even for 100 times of pulse input, and the number of times of discharge errors was measured by counting this number of times for occasions of no discharge.

Discharge fluctuations shown in Table 1 are represented by ts in the expression (1), and their values are indicated as a relative value for that of the plasma display panel (3-1). As for ts representing discharge fluctuations, it indicates that the smaller its value is, the smaller the discharge fluctuation is. When the discharge fluctuation is large, it means that discharge is not started within a certain period of time from the moment of inputting, which further means that quality of display is remarkably lowered.

TABLE 1

| Plasma display panel No. | Phosphor No. | MnS/MnI | Charging amount (μC/g) | Luminance after deterioration | Discharge fluctuation (Relative amount) | Discharge errors (in 100 pulse inputs) | Remarks |
|---|---|---|---|---|---|---|---|
| Plasma display panel (3-1) | Phosphor (1-1) | 0.00 | −28 | 100 | 1.0 | 20 | Comp. |
| Plasma display panel (3-2) | Phosphor (1-2) | 0.25 | −7 | 99 | 0.9 | 17 | Comp. |
| Plasma display panel (3-3) | Phosphor (1-3) | 0.33 | 5 | 99 | 0.5 | 8 | Inv. |
| Plasma display panel (3-4) | Phosphor (1-4) | 0.47 | 16 | 98 | 0.4 | 6 | Inv. |
| Plasma display panel (3-5) | Phosphor (1-5) | 0.54 | 22 | 98 | 0.3 | 4 | Inv. |
| Plasma display panel (3-6) | Phosphor (1-6) | 0.66 | 29 | 97 | 0.1 | 2 | Inv. |
| Plasma display panel (3-7) | Phosphor (1-7) | 0.73 | 31 | 91 | 0.1 | 2 | Comp. |

Inv.: Present invention
Comp.: Comparative example
MnS: Mn concentration in a superficial portion of a phosphor
MnI: Mn concentration inside a phosphor The results are shown in Table 1. With regard to aging deterioration, it is understood that luminance deterioration of plasma display panel (3-7) is remarkable compared with conventional plasma display panel (3-1), but luminance deteriorations for plasma display panels (3-3)-(3-6) of the invention are slight. Further, with regard to stability of discharge, it is understood that discharge fluctuations and discharge errors for plasma display panels (3-3)-(3-6) of the invention are sharply improved, compared with conventional plasma display panel (3-1).

EFFECT OF THE INVENTION

In the invention described in Structure 1, activator concentration in a superficial portion of a phosphor is prescribed as stated above in a $Zn_2SiO_4$:Mn phosphor containing Mn as an activator that serves as a major emission, and therefore, a distortion of a crystal structure of a base material caused by an activator dope in the superficial portion of the phosphor can be made small, and crystallinity can be enhanced, thus, aging luminance deterioration can be prevented, compared with an occasion wherein an activator concentration in a superficial portion of a phosphor and that inside the phosphor are not prescribed in particular, and both of them are the same each other.

In this case, when the charging amount of the phosphor is on the positive polarity side, in particular, it is possible to produce a phosphor that shows the same polarity as that of the phosphor whose charging amount indicates a positive polarity when a plasma display panel is constituted, thus, stability in the course of discharging can be enhanced by reducing fluctuations in electric discharge and discharge failures, which makes it possible to prevent deterioration of discharging characteristics.

In the invention described in Structure 2, compared with the invention described in Structure 1, it is possible to make a charging amount of the phosphor to be on the positive polarity side while maintaining some crystallinity by controlling a distortion of a crystal structure of a base material in the superficial portion of the phosphor to a certain extent, whereby, an improvement of crystallinity can be made compatible with that of stability in the case of discharging, which further makes prevention of aging deterioration of luminance to be compatible with that of aggravation of discharging characteristics.

In the invention described in Structure 3, a distortion of a crystal structure of a base material caused by an activator dope on the circumference of the activator in the superficial portion of the phosphor can be made small, and when a plasma display panel is constituted under the condition that the charging amount prescribed as stated above can be maintained while enhancing crystallinity, it is possible to show the same polarity as that of a phosphor wherein a charging amount shows positive polarity, and to enhance stability in the course of discharging, by reducing fluctuations in electric discharge and discharge failures, which further makes it possible to prevent aggravation of discharging characteristics while preventing aging deterioration of luminance.

In the invention described in Structure 4, the plasma display panel may have the same effects as those obtained in Structures 1-3. Accordingly, aggravation of discharging characteristics can be prevented while aging deterioration of luminance is prevented, in the plasma display panel.

What is claimed is:

1. A phosphor comprising $Zn_2SiO_4$:Mn particles,
   wherein Mn is an activator, and a ratio of the activator concentration in a superficial portion of a phosphor particle to the activator concentration inside the phosphor particle is 0.3-0.7.

2. The phosphor of claim 1,
   wherein a ratio of the activator concentration in a superficial portion of a phosphor particle to the activator concentration inside the phosphor particle is 0.5-0.7

3. The phosphor of claim 1,
   wherein an amount of electrostatic charges is in a range of 0-+30 μC/g.

4. The phosphor of claim 2,
   wherein an amount of electrostatic charges is in a range of 0-+30 μC/g.

5. A plasma display panel comprising a discharge cell containing the phosphor of claim 1.

6. A plasma display panel comprising a discharge cell containing the phosphor of claim 2.

7. A plasma display panel comprising a discharge cell containing the phosphor of claim 3.

* * * * *